US008688722B1

(12) United States Patent
Kostamaa et al.

(10) Patent No.: US 8,688,722 B1
(45) Date of Patent: Apr. 1, 2014

(54) PROCESSING A SEQUENCE OF OUTER JOINS

(75) Inventors: O. Pekka Kostamaa, Santa Monica, CA (US); Yu Xu, San Diego, CA (US)

(73) Assignee: Teradata US, Inc., Dayton, OH (US)

(*) Notice: Subject to any disclaimer, the term of this patent is extended or adjusted under 35 U.S.C. 154(b) by 628 days.

(21) Appl. No.: 12/639,380

(22) Filed: Dec. 16, 2009

(51) Int. Cl.
G06F 7/00 (2006.01)
G06F 17/30 (2006.01)

(52) U.S. Cl.
USPC ............ 707/756; 707/736; 707/754; 707/758

(58) Field of Classification Search
None
See application file for complete search history.

(56) References Cited

U.S. PATENT DOCUMENTS 6,850,927 B1 * 2/2005 Hsu ........................ 707/999.002
6,957,222 B1 * 10/2005 Ramesh ..................... 707/999.1
2011/0137890 A1 * 6/2011 Bestgen et al. ............... 707/719

OTHER PUBLICATIONS

Alsabti et al., Skew-Insensitive Parallel Algorithms for Relational Join dated 1998 (25 pages).
Bamha et al., Frequency-Adaptive Join for Shared Nothing Machines, LIFO, Universite d'Orleans, B.P. 6759, France dated 2001 (14 pages).
Bhargava et al., Simplification of Outer Joins dated 1995 (13 pages).
Chen, Arbee L.P., Outerjoin Optimization in Multidatabase Systems, CH2895-1/90/0000/0211, 1990, IEEE (8 pages).
Dewan et al., Predictive Dynamic Load Balancing of Parallel Hash-Joins Over Heterogeneous Processors in the Presence of Data Skew dated 1994 (18 pages).
DeWitt et al., Parallel Database Systems: The Future of High Performance Database Processing, ACM, vol. 36, No. 6, Jun. 1992 (26 pages).
DeWitt et al., Practical Skew Handling in Parallel Joins, Department of Computer Sciences/HP-Labs, Jul. 14, 1992 (24 pages).
R.L. Graham, Bounds on Multiprocessing Timing Anomalies, Siam J. Appl. Math., vol. 17, No. 2, Mar. 1969 (14 pages).
Hua et al., Handling Data Skew in Multiprocessor Database Computers Using Partition Tuning, Proceedings of 17th International Conference of Very Large Bases, Barcelona, Sep. 1991 (11 pages).
Kitsuregawa et al., Bucket Spreading Parallel Hash: A New, Robust, Parallel Hash Join Method for Data Skew in the Super Database Computer (SDC), Proceedings of the 16th VLDB Conference, Australia, 1990 (12 pages).
Larson et al., View Matching for Outer-Join Views, Proceedings of the 31st VLDB Conference, Norway, 2005 (12 pages).
Larson et al., Efficient Maintenance of Materialized Outer-Join Views, 2007 (10 pages).

(Continued)

*Primary Examiner* — Jau-Shya Meng
(74) *Attorney, Agent, or Firm* — Trop, Pruner & Hu, P.C.; Ramin Mahboubian

(57) ABSTRACT

To process a sequence of outer joins in a database system, the database system performs a first outer join of the sequence of outer joins. A result of the first outer join is stored in a result table stored across plural storage modules of the database system. At least a subset of records of the result table is redistributed across the storage modules according to a first join attribute of the result table, where any record of the result table that has a null value for the first join attribute is not redistributed. A second outer join of the sequence is performed using the redistributed result table and another table, where the second outer join is based on the first join attribute of the result table.

18 Claims, 6 Drawing Sheets

(56) References Cited

OTHER PUBLICATIONS

Shatdal et al., Using Shared Virtual Memory for Parallel Join Processing, 1993 (10 pages).
Stonebraker, University of California, The Case for Shared Nothing, 1986 (5 pages).
Walton et al., A Taxonomy and Performance Model of Data Skew Effects in Parallel Joins, Proceedings of the 17th International Conference on Very Large Bases, Barcelona, Sep. 1991 (12 pages).
Xu et al., Efficient Outer Join Skew Handling in Parallel DBMS, VLDB 09, Aug. 24-28, 2009, France (7 pages).
Xu et al., Handling Data Skew in Parallel Joins in Shared-Nothing Systems, SIGMOD '08, Jun. 9-12, 2008 (10 pages).

* cited by examiner

PROCESSING A SEQUENCE OF OUTER JOINS

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can be issued to insert new entries into a table of a database (such as to insert a row into the table), modify the content of the table, or to delete entries from the table. Examples of SQL statements include INSERT, SELECT, UPDATE, and DELETE.

SQL queries can also specify joins of two or more tables in a database. A join operation combines records (e.g., rows) from the two or more tables of the database. One type of join is an inner join. The result of the inner join includes records from the tables being joined that satisfy the join predicate of the SQL query.

A different type of join is an outer join, which contains the result of the inner join as well as non-matching records of one or more tables. There are three types of outer joins: left outer join, right outer join, and full outer join. In one example, assume that a left outer join of tables A and B is being performed. The left outer join will produce a result that contains all records of the left table (A), even if the join condition of the SQL query does not find any matching record in the right table (B). In contrast, a right outer join would produce a result that has all records of the right table (B), even if the join condition does not find any matching record in the left table (A). A full outer join combines the results of both left and right outer joins.

The performance of outer joins in a parallel database management system having multiple processing units can suffer, since the performance of outer joins can involve relatively large amounts of data communications among the processing units over a communications medium, which can present a bottleneck.

SUMMARY

In general, according to an embodiment, a technique is provided to improve the performance of a sequence of outer joins in a parallel database system that has multiple storage modules containing respective portions of tables that are to be joined.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

Figure 1:
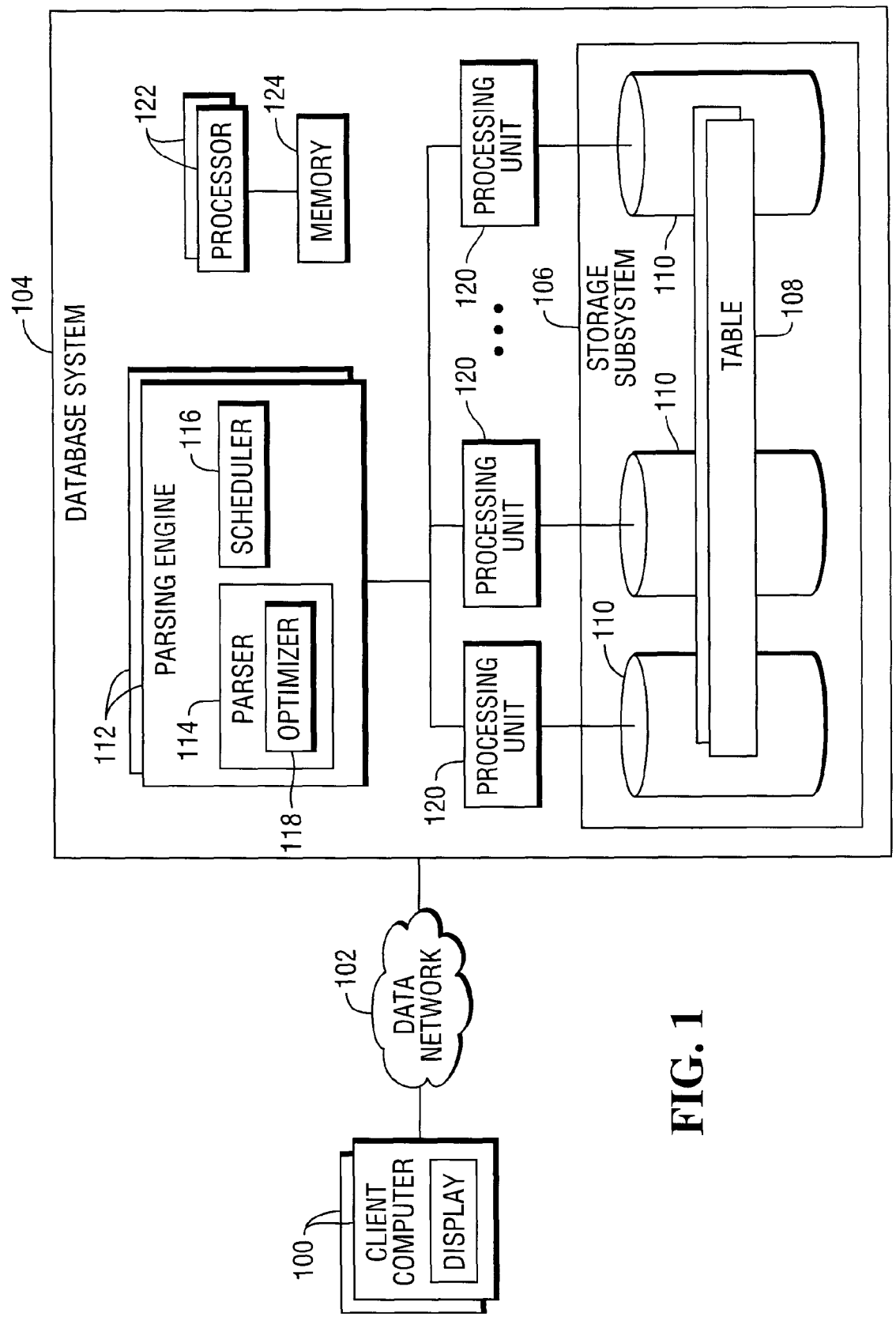
FIG. 1 is a block diagram of an example arrangement that includes a database system in which some embodiments of the invention are incorporated.

In accordance with some embodiments, techniques or mechanisms are provided for efficiently performing a sequence of outer joins in a parallel database system having multiple storage modules. Tables to be joined are distributed across the multiple storage modules of the parallel database system. A sequence of outer joins includes at least a first outer join followed by a second outer join. Prior to performing a first outer join, tables to be joined are redistributed across the storage modules based on corresponding join attributes of the tables. A join attribute refers to the attribute of a table that is specified in the join predicate of a join query. The join predicate specifies a join condition between the join attribute of a first table and a corresponding join attribute of a second table for matching records (e.g., rows) of the tables to be joined.

After redistributing the records of the first and second tables to be joined based on the respective join attributes, the first outer join is performed. The result records of the join operation are placed in a result table. Since an outer join is performed, the result table contains all records of at least one of the first and second tables, even if the join condition is not satisfied for some of such records.

Next, a subset of the records of the result table is redistributed across the multiple storage modules based on a join attribute of the second outer join. However, any record of the result table that has a null value for the join attribute of the second outer join is not redistributed. A record of the result table that has a null value for the join attribute of the second outer join is a record of at least one of the first and second tables that was included in the result table even though such record did not have a matching record in the other table. A "null value" refers to a value (empty value or some predefined value) used to indicate that the value assigned to the particular attribute is not valid. Since an outer join keeps all records of at least one of the tables to be joined in the first outer join (depending on whether the join is a left outer join, right outer join, or full outer join), some of the records in the result table will be "dangling" records that contain null values for attributes of the second table associated with records of the second table that do not match corresponding records of the first table based on a join between the first and second tables.

Effectively, in accordance with some embodiments, dangling records of the result table are distributed differently from non-dangling records of the result table, where a non-dangling record of a result table contains attributes of records of the first and second tables that were matched in the first outer join. Non-dangling records are redistributed according to a join attribute of the second outer join, whereas dangling records of the result table are not redistributed, but rather are kept in their original storage modules.

After redistributing just the non-dangling records of the result table without redistributing the dangling records, the second outer join of the sequence of outer joins is performed between the records of the result table and records of a third table to produce a final result table. Although the example above refers to a sequence of just two outer joins, note that the sequence can include addition outer join(s) in other implementations.

By not redistributing dangling records of the result table prior to performing the second outer join, reduced skew is achieved by avoiding redistributing dangling records of the result table to a single particular storage module, which would have resulted in a processing unit associated with that particular storage module performing more work in the second outer join (as compared to other processing units). Since the dangling records of the result table have null values for the join attribute of the second outer join, a redistribution of all records of the result table based on the join attribute of the second outer join would have caused all dangling records to be distributed to a single storage module, since the dangling records share the same join attribute value (null value).

FIG. 1 illustrates an example arrangement in which a client station (or plural client stations) 100 is (are) coupled to a database management system 104 over a data network 102. Examples of the data network 102 include a local area network (LAN), a wide area network (WAN), the Internet, and so forth. Each client station 100 is capable of issuing queries according to a standard database query language to the database system 104 to access or update data or to create or alter data structures (e.g., tables, databases, views, and so forth). One example of a standard database query language is SQL, as promulgated by the American National Standards Institute (ANSI).

The database system 104 includes a storage subsystem 106 that stores various data, including relational tables 108. Each relational table 108 contains rows and columns. The relational tables can be base tables or intermediate tables storing results of database operations, such as join operations. The storage subsystem 106 includes plural storage modules 110, which can be physical storage devices or logical representations of partitions of the storage subsystem 106.

The database system 104 also includes one or more parsing engines 112, each having a parser 114 and a scheduler 116. The parser 114 receives database queries (such as those submitted by the client stations 100), parses each received query, and generates executable steps for the parsed query. The parser 114 includes an optimizer 118 that generates query plans in response to a query, selecting the most efficient from among the plural query plans. The scheduler 116 sends the executable steps generated by the parser 114 to multiple processing units 120 in the database system 104.

In some implementations, each processing unit 120 can perform one or more of the following tasks: inserts, deletes, or modifies contents of tables; creates, modifies, or deletes definitions of tables; retrieves information from definitions and tables; and locks databases and tables. In one example, each processing unit 120 is based on an access module processor (AMP) used in some TERADATA® database systems from Teradata Corporation. Each processing unit 120 manages access of data in respective storage modules 110. The presence of multiple processing units 120, parsing engines 112, corresponding storage modules 110, and the underlying hardware define a parallel database system.

The processing units 120 and parsing engine(s) 112 are software modules that are part of the database management software executable in the database system 104. The database management software is executable on one or more processors 122 of the database system 104. The processor(s) 122 is (are) connected to a memory 124.

In the example of FIG. 1, the components of the database system 104 are depicted as being part of one computer node. Note that the database system 104 can actually be implemented in a multi-node system, where each of the multiple computer nodes contains one or more processing units 120 and parsing engines 112 (and corresponding one or more processors 122) to provide a parallel database system The memory 124 can be implemented with one or more memory devices, such as the random access memories (DRAMs), flash memories, or other types of semiconductor or integrated circuit memory devices. Alternatively, the memory 124 can be implemented using disk-based storage that has higher access speeds than the storage media used to implement the storage subsystem 106.

The following describes an example of performing a sequence of left outer joins, expressed as follows:

$$R \overset{o}{\bowtie}_L S \overset{o}{\bowtie}_L T$$
$$R.a=S.b \quad S.c=T.d$$

The following query specifies such a sequence of outer joins:
SELECT x, y, z, a, c
FROM R left outer join S on R.a=S.b
left outer join T on S.c=T.d In the example above, R, S, and T represent three corresponding base tables that are to be joined. The first left outer join is to join base tables R and S, whereas the second outer join is to perform a join of the result of the left outer join of R and S with the records of the base table T. In the above example, a left outer join of a table R with table S produces a result that includes all records of the table R, as well as any records of the table S that satisfy the join condition (R.a=S.b).

Figure 2A:
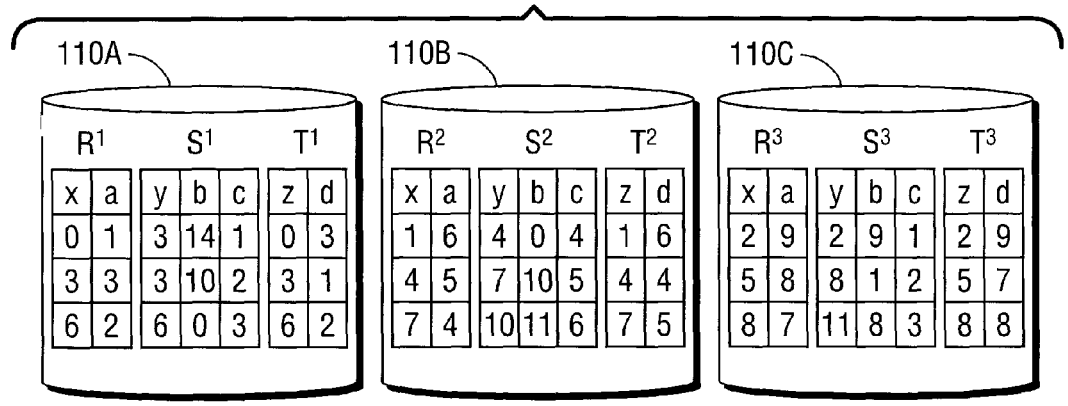
FIGS. 2A-2E illustrate performance of a sequence of outer joins, according to a conventional technique.

As shown in FIG. 2A, the records of R, S, T are hash partitioned across storage modules 110A, 110B, and 110C. Referring to FIG. 1, each of the storage modules 110A-110C is associated with a corresponding processing unit 120. Hash partitioning records of a table for distribution across the storage modules of the database system 104 refers to applying a hash function to a partitioning column of the table, where the partitioning column includes one or more attributes of the table, as specified by a user or automatically chosen by the system.

In the example of FIG. 2A, the partition column of table R is R.x, the partitioning column of table S is S.y, and the partitioning column of table T is T.z. The hash function is applied to the partitioning column of a table to produce one of multiple output hash values. The result of applying the hash function to the partitioning column determines where a record of a table will be distributed. Different output hash values produced by application of the hash function to the partitioning column of different records of the table will cause the corresponding records to be distributed to different storage modules.

In FIG. 2A, the records of table R are distributed into sub-portions $R^1$, $R^2$, and $R^3$, and records of table S are distributed into sub-portions $S^1$, $S^2$, and $S^3$, and the records of table T are distributed into sub-portions $T^1$, $T^2$, and $T^3$.

Figure 2B:
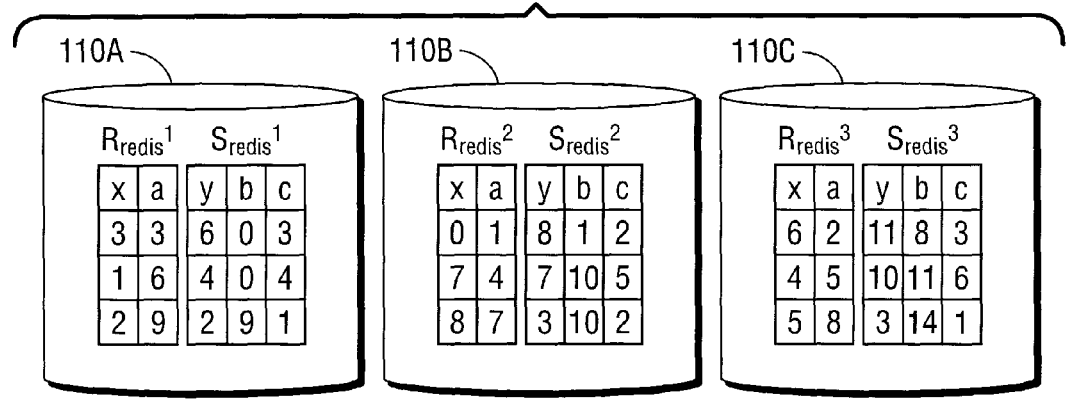

In the example given above, the first left outer join specifies a join of tables R and S using join attributes R.a and S.b. Prior to performing the first left outer join, the records of R are redistributed based on hash values of the join attribute R.a, and the records of S are redistributed based on the hash values of join attribute S.b. The redistribution of the records of R and records of S is shown in FIG. 2B. The redistributed rows of R are stored in $R_{redis}$ ($R_{redis}^1$, $R_{redis}^2$, $R_{redis}^3$ shown in FIG. 2B), and the redistributed rows of S are stored in $S_{redis}$ ($S_{redis}^1$, $S_{redis}^2$, $S_{redis}^3$ shown in FIG. 2B). The redistributed records of R and S are then left outer joined, and the results of the left outer join are stored in a first temporary table J, shown as $J^1$, $J^2$, and $J^3$ in FIG. 2C.

Figure 2C:
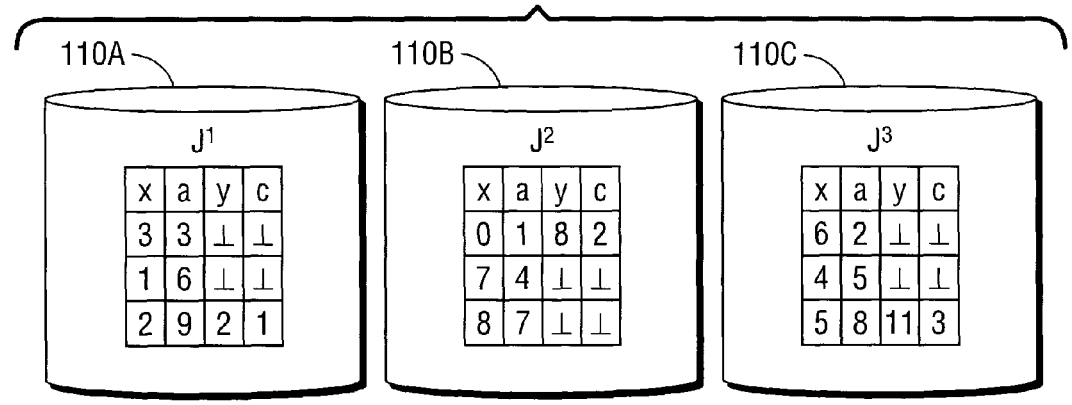

Note that in FIGS. 2A and 2B, the records of R, S, and T (and of $R_{redis}$ and $S_{redis}$ are generally evenly partitioned across the storage modules 110A-110C. FIG. 2C also shows that the temporary table J is also generally evenly partitioned across the storage modules 110A-110C.

However, the temporary table J contains dangling records, which are records in which attributes of the records of table S do not match corresponding records of table R. The entries of temporary table J corresponding to records of table S that do not match records of table R (as specified by the join condition R.a=S.b) are represented with null values, represented with ⊥ in FIG. 2C.

Figure 2D:
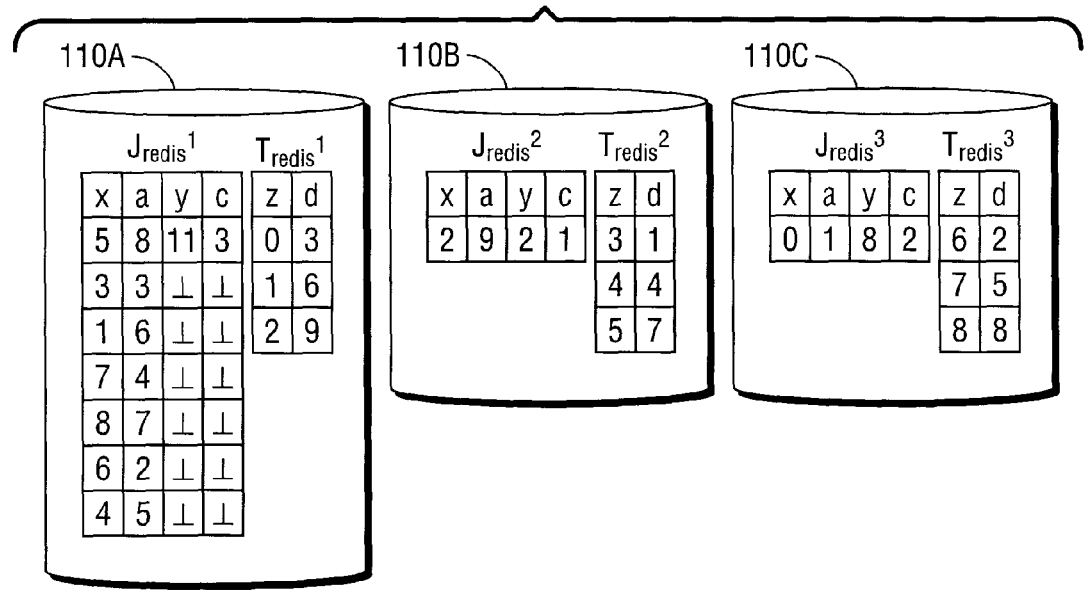

Conventionally, prior to performing the second left outer join of the result table J with the T, all records of J and T are redistributed according to respective join attributes: J.c and T.d. As shown in FIG. 2D, records of result table J containing null values for J.c are all distributed to a particular one of the storage modules, which in the example of FIG. 2B is storage module 110A. As a result, it can be seen that there will be significant skewing of records of the result table J, with storage module 110A containing significantly more records of J than the remaining storage modules 110B and 110C.

Figure 2E:
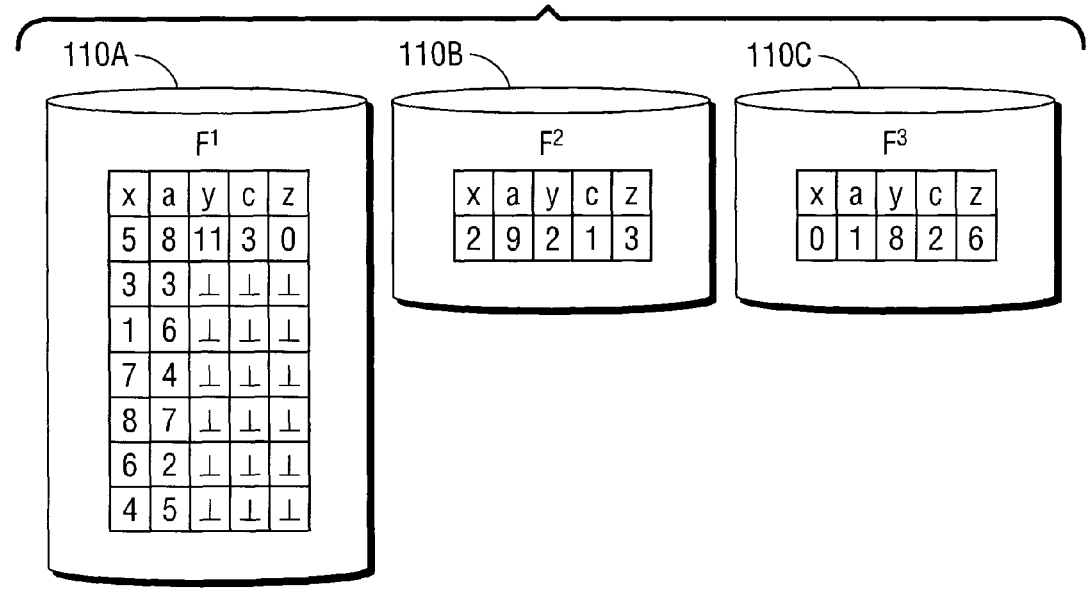

The redistributed records of table J are placed in $J_{redis}$ and the redistributed records of table T are stored in $T_{redis}$. The records of $J_{redis}$ and $T_{redis}$ are then left outer joined based on join attributes $J_{redis}$.c and $T_{redis}$.d, to produce results of the second left outer join that are stored in a result table F, shown as $F^1$, $F^2$, and $F^3$ in FIG. 2E. Note that the processing unit associated with storage module 110A will perform significantly more work for the second outer join than the processing units associated with storage modules 110B and 110C, since storage module 110A contains more records of $J_{redis}$. This skewing of records of the redistributed intermediate result table J will cause database system performance to suffer, since the processing unit associated with storage module 110A will take more time to complete its portion of the second outer join than the remaining processing units.

In accordance with some embodiments, to address the above issue, the intermediate result table J containing records of the first outer join is redistributed in a different manner. The intermediate result table J is divided into two table portions $J_2$ and $J_{local}$. The temporary table portion $J_{local}$ contains dangling records, whereas $J_2$ contains non-dangling records. Although reference is made to two table portions $J_{local}$ and $J_2$, it is noted that $J_2$ and $J_{local}$ can be considered two separate intermediate tables. As used herein, a "result table" or "intermediate table" can refer to a single table with multiple portions, or to two tables that collectively store results of a join operation. More generally, a "table portion" can refer to a subset of a table or a distinct and separate table.

Figure 3A:
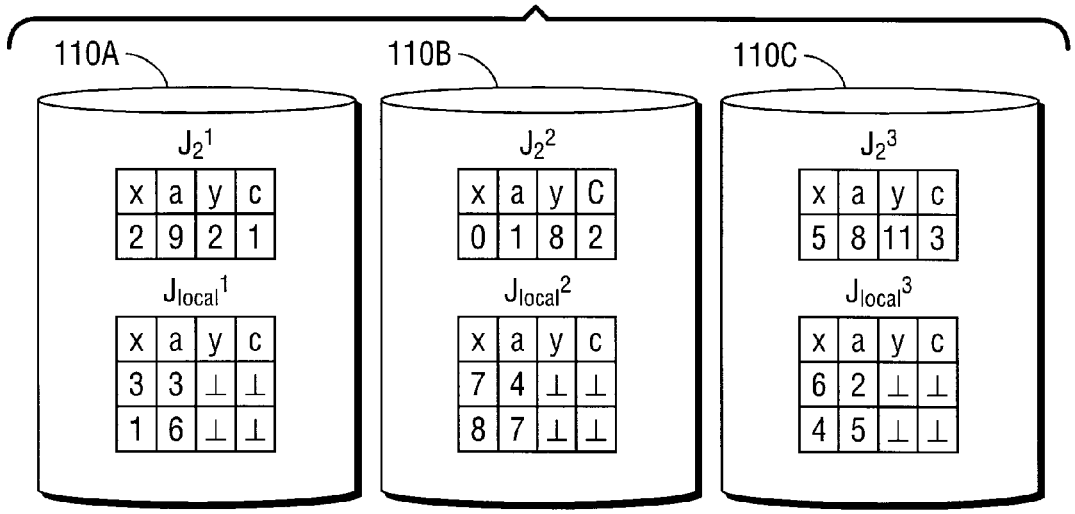
FIGS. 3A-3C illustrate performance of a sequence of outer joins using a technique according to an embodiment.
Figure 3B:
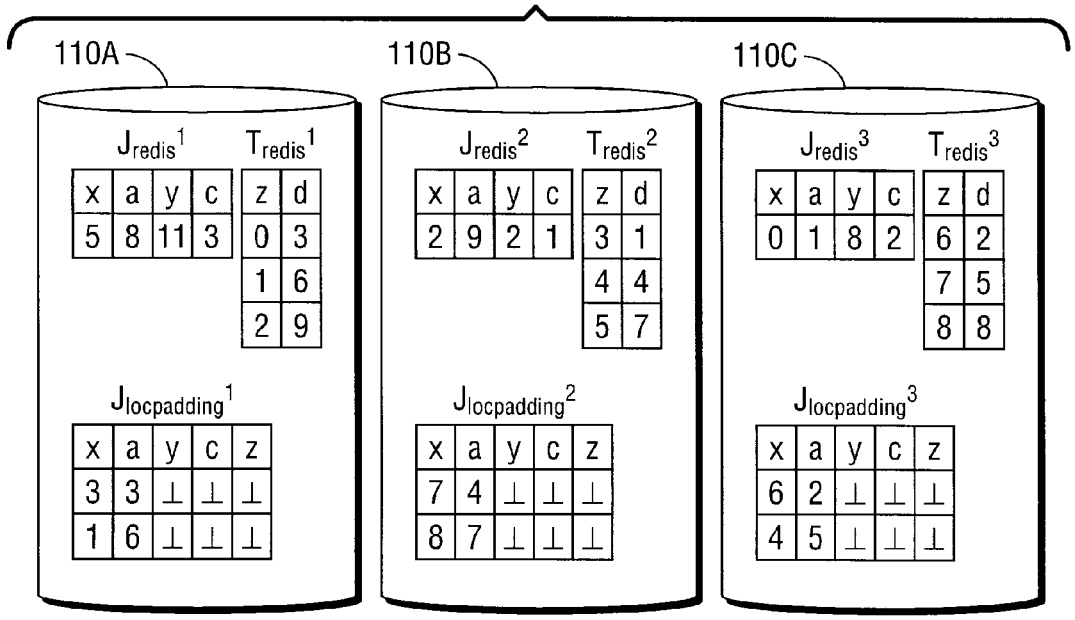

The records of $J_{local}$ are not redistributed, whereas the records of $J_2$ are redistributed, as shown in FIG. 3A. The redistributed records of $J_2$ are stored in $J_2$ (shown as $J_2^1$, $J_2^2$, and $J_2^3$ in FIG. 3A). Note that in practice the intermediate table $J_2$ is only logical (not materialized) since every row in $J_2$ is hash redistributed on the fly after it is computed. The records of $J_{local}$ are kept locally in the respective storage module, as shown. Records of $J_{local}$ are kept locally and padded with nulls for the projected attribute(s) of T, as shown in FIG. 3B. The projected attribute of T is T.z. The padded version of $J_{local}$ is represented as $J_{locpadding}$, as shown in FIG. 3B. The reason for padding $J_{local}$ with null values for the projected attribute(s) of T is to prepare for the merging of $J_{local}$ with the results of the second outer join of $J_2$ and $T_{redis}$.

Figure 3C:
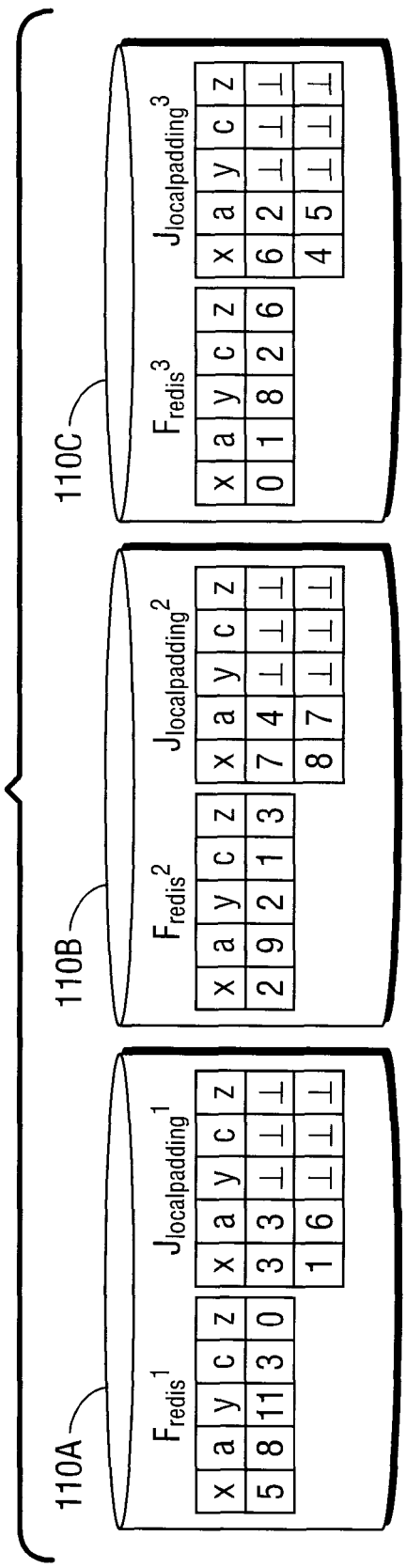

The records of $J_2$ are left outer joined and with the records of $T_{redis}$, according to the second left outer join, and the results are stored in a result table $F_{redis}$, as shown in FIG. 3C. The final result of the second outer join is the union of $F_{redis}$ and $J_{locpadding}$, as shown in FIG. 3C.

Figure 4:
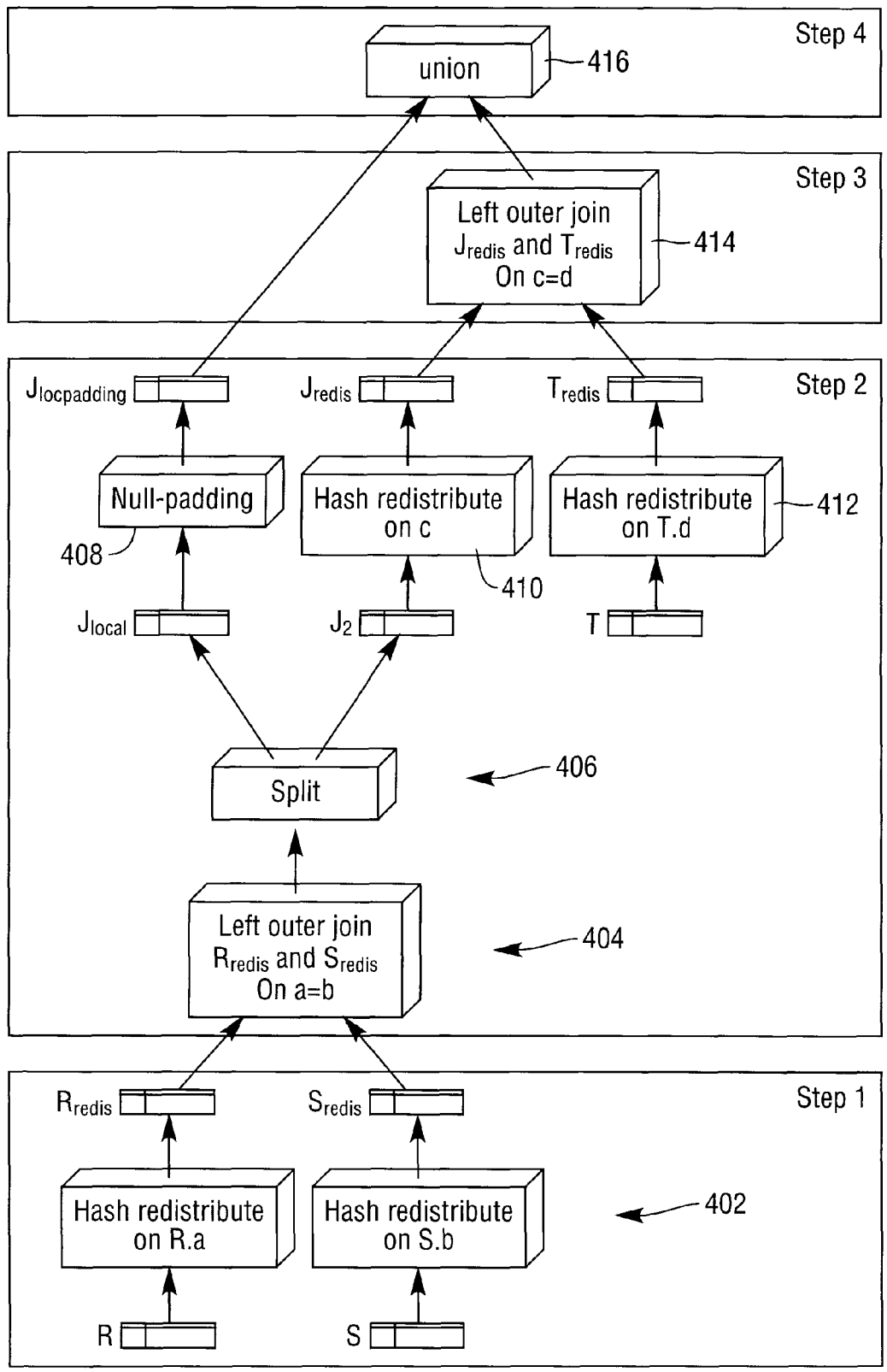
FIG. 4 is a flow diagram of a process of performing a sequence of outer joins, according to an embodiment.

FIG. 4 illustrates an example flow diagram of performing a sequence of outer joins (first outer join of R and S, followed by a second outer join of the join of R and S with T) according to an embodiment. In step 1, base tables R and S are hash redistributed (at 402) on join attributes R.a and S.b. The redistributed records of R and S are stored in $R_{redis}$ and $S_{redis}$, respectively, as shown in FIG. 4. A first left outer join is then performed between $R_{redis}$ and $S_{redis}$ (at 404). The result of the first left outer join is split (at 406) into $J_{local}$ and $J_2$. Null padding of the projected attribute(s) of T is applied to $J_{local}$ (at 408) to produce $J_{locpadding}$. $J_2$ is hash redistributed on J.c (at 410) to produce $J_{redis}$. The third table T is hash redistributed on join attribute T.d to produce $T_{redis}$.

The second left outer join is then applied (at 414) to $J_{redis}$ and $T_{redis}$, and a union (416) of the result of the second left outer join and $J_{locpadding}$ is calculated (at 416) to produce a final result of the sequence of left outer joins in the example given above.

The process shown in FIG. 4 can continue for additional outer joins if there are more outer joins in the sequence of outer joins to be calculated.

By using techniques or mechanisms according to some embodiments to perform a sequence of outer joins, skewing of data is avoided or reduced such that each of the processing units of the database system performs substantially even work to avoid the situation in which one or more of the processing units perform substantially more work than other processing units.

Instructions of software described above (including the database management software including parsing engine(s) 112 and processing units 120 of FIG. 1) are loaded for execution on one or more processors (such as one or more processors 122 in FIG. 1). The processors include microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of processing a sequence of outer joins in a database system that includes multiple processing units each executable by one or more processors, comprising:
 performing, by the multiple processing units of the database system, a first outer join of the sequence of outer joins;

storing a result of the first outer join in a result table stored across plural storage modules of the database system;

redistributing, by at least one of the multiple processing units to another one of the multiple processing units, at least a subset of records of the result table across the storage modules according to a first join attribute of the result table, wherein any record of the result table that has a null value for the first join attribute is not redistributed by the at least one of the multiple processing units to the other one of the multiple processing units, wherein the result table includes a first result table portion and a second result table portion, wherein the first result table portion contains records having the first join attribute assigned the null value, and the second result table portion contains records having a valid value for the first attribute, and wherein the redistributing at least the subset of records of the result table comprises redistributing the second result table portion without redistributing the first result table portion; and performing, by the one or more processors, a second outer join of the sequence using the redistributed result table and another table, wherein the second outer join is based on the first join attribute of the result table.

2. The method of claim 1, wherein the first outer join involves a first table and a second table based on join attributes of the first outer join, the method further comprising:

prior to performing the first outer join, redistributing the first and second tables across the storage modules according to the join attributes of the first outer join.

3. The method of claim 2, wherein records of the result table containing the null value for the first join attribute correspond to records of the second table that do not match records of the first table based on a join condition of the first outer join.

4. The method of claim 1, wherein performing the second outer join is performed by the processing units each locally joining rows of result table and the another table stored in the corresponding storage module.

5. The method of claim 1, wherein performing the second outer join comprises performing the second outer join of the redistributed second result table portion with the another table.

6. The method of claim 5, further comprising performing a union of the first result table portion with a result of the second outer join of the redistributed second result table portion with the another table.

7. The method of claim 5, further comprising:

prior to performing the union, padding the first result table portion with one or more attributes of the another table, wherein performing the union comprises performing the union of the padded first result table portion with the result of the second outer join.

8. A non-transitory computer readable storage medium storing at least instructions that upon execution cause one or more processors of a database system to:

receive a query to perform a sequence of outer joins, wherein the sequence includes at least a first outer join and a second outer join;

perform the first outer join of first and second tables based on a first join condition;

store a result of the first outer join in a result table;

split the result table into a first result table portion and a second result table portion, wherein the first result table portion contains records having the first join attribute assigned the null value, and the second result table portion contains records having a valid value for the first attribute;

redistribute the second result table portion across a plurality of storage modules without redistributing the first result table portion; and perform a second outer join based on the first result table portion and the redistributed second result table portion.

9. The non-transitory computer readable storage medium of claim 8, wherein the second outer join is based on a second join condition, wherein redistributing the second result table portion is based on a join attribute of the second result table portion.

10. The non-transitory computer readable storage medium of claim 9, wherein performing the second outer join comprises performing the second outer join of the redistributed second result table portion and a third table, and wherein the instructions upon execution cause the one or more processors to further:

store, in an intermediate table, a result of the second outer join of the redistributed second result table portion and the third table.

11. The non-transitory computer readable storage medium of claim 10, wherein the instructions upon execution cause the one or more processors to further:

perform a union of the intermediate table and the first result table portion.

12. The non-transitory computer readable storage medium of claim 11, wherein the instructions upon execution cause the one or more processors to further:

prior to performing the union, padding the first result table portion with one or more attributes of the third table, wherein performing the union comprises performing the union of the padded first result table portion with the intermediate table.

13. The non-transitory computer readable storage medium of claim 8, wherein the instructions upon execution cause the one or more processors to further:

prior to performing the first outer join, redistributing the first and second tables according to join attributes of the first join condition, wherein performing the first outer join is of the redistributed first and second tables.

14. A database system comprising:

a storage subsystem having plural storage modules to store tables; and one or more processors;

wherein the database system:

performs a first outer join of a sequence of outer joins;

stores a result of the first outer join in a result table distributed across the plural storage modules;

redistributes at least a subset of records of the result table across the storage modules according to a first join attribute of the result table, wherein any record of the result table that has a null value for the first join attribute is not redistributed, wherein the result table includes a first result table portion and a second result table portion, wherein the first result table portion contains records having the first join attribute assigned the null value, and the second result table portion contains records having a valid value for the first attribute, and wherein the redistributing at least the subset of records of the result table comprises redistributing the second result table portion without redistributing the first result table portion; and performs a second outer join of the sequence using the redistributed result table and an another table, wherein the second outer join is based on the first join attribute of the result table.

15. The database system of claim 14, wherein the first outer join involves a first table and a second table based on join attributes of the first outer join, the method further comprising:

prior to performing the first outer join, redistributing the first and second tables across the storage modules according to the join attributes of the first outer join.

16. The database system of claim 15, wherein records of the result table containing the null value for the first join attribute correspond to records of the second table that do not match records of the first table based on a join condition of the first outer join.

17. The database system of claim 14, wherein the sequence of outer joins comprises a sequence of left outer joins, a sequence of right outer joins, or a sequence of full outer joins.

18. The database system of claim 14, wherein performing the second outer join comprises performing the second outer join of the redistributed second result table portion with the another table.

\* \* \* \* \*